United States Patent Office 3,459,633
Patented Aug. 5, 1969

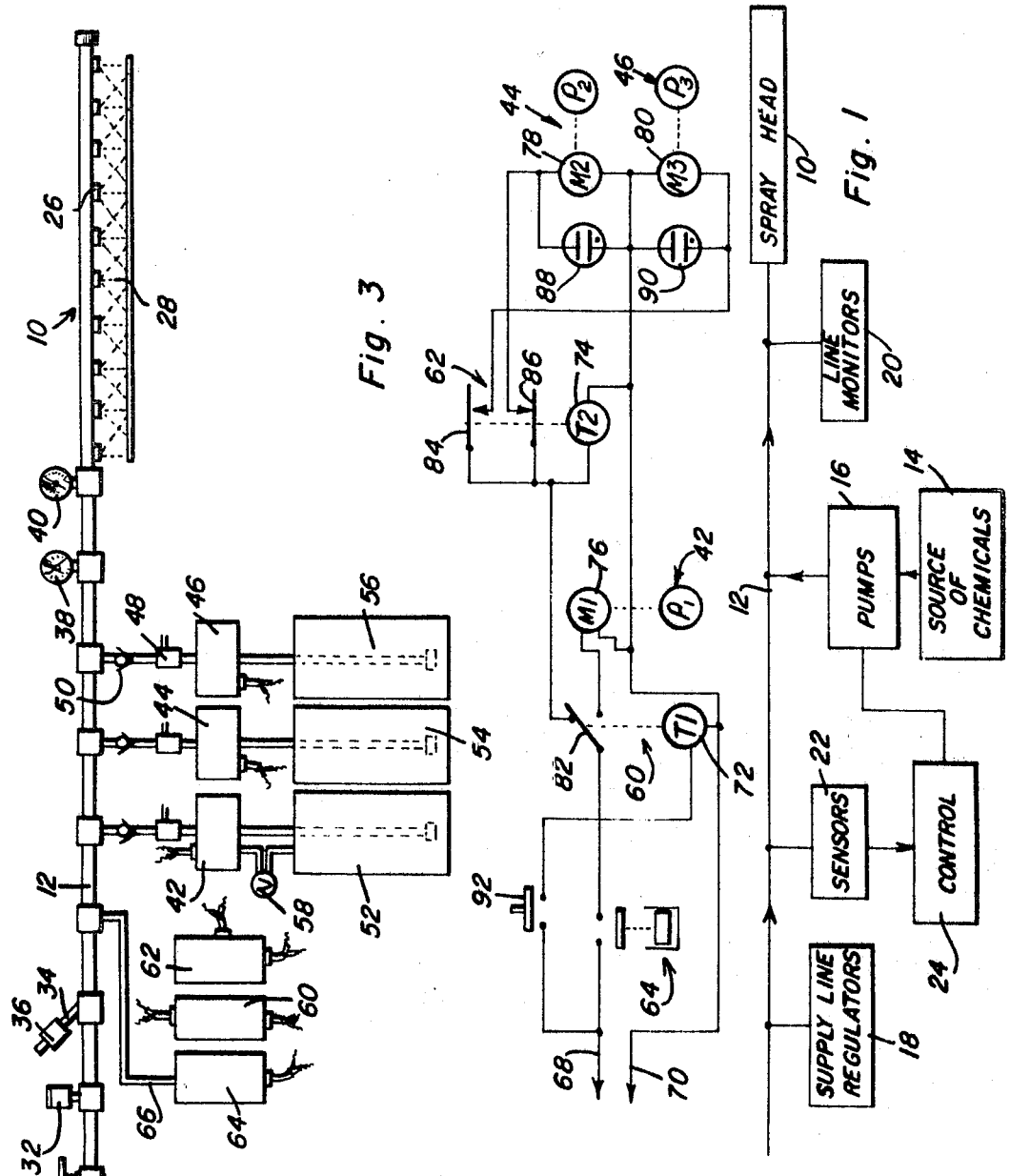
Shannon V. West
INVENTOR.

3,459,633
FELT CONDITIONER CONTROL SYSTEM
Shannon V. West, 8275 Six Pence Drive,
Pensacola, Fla. 32504
Filed May 4, 1967, Ser. No. 636,110
Int. Cl. D21c *1/02;* D21f *1/34*
U.S. Cl. 162—275                                10 Claims

ABSTRACT OF THE DISCLOSURE

Apparatus for conditioning felt in the manufacture of paper by application of water in spray form, chemical ingredients being successively introduced into the water by a slug and continuous pumps under control of timers. Water is supplied under a regulated pressure and temperature sensed by a pressure switch preventing operation of the timers and pumps until flow conditions are proper.

Background of the invention

This invention relates to the manufacture of fibrous material or paper and more particularly to the conditioning of the material felt during the paper manufacturing process by washing and treating of the felt with chemical ingredients.

In the paper manufacturing process, felt is conditioned by washing thereof with water and applying chemical ingredients thereto. Depending upon different product requirements, the concentration and types of chemical ingredients within the water is varied. The application of the desired quantities of chemical ingredients and the handling of the chemicals for conditioning the felt, presents a problem to which the present invention is addressed. In this regard, it will be appreciated that it is desirable to regulate not only the concentration of the chemical ingredients within its carrier liquid or water, but also the duration of its application and the conditions under which it is applied.

Summary of the invention

In accordance with the present invention, sheets of felt are continuously conditioned by the application of liquid in spray form applied through a spray or shower head. Water under the proper pressure and temperature conditions is supplied to the spray head and chemical ingredients are added to the water by pumps under control of timers that regulate the duration and quantity of chemical ingredients supplied when conditions are proper.

The apparatus of the present invention therefore features a plurality of chemical pumps including a slug pump and at least two continuous pumps through which different chemical ingredients are introduced in succession to the water under control of timers. Operation of the slug pump is controlled by a selectively resettable timer which is also operative during its timing cycle to prevent operation of the continuous pumps, the continuous pumps being alternatively operated under control of an alternating timer until such time as the re-settable timer and slug pump are activated. Operation of all the timers and pumps is also disabled by means of a pressure switch responsive to the flow of water in the supply conduit until such time as proper flow conditions exist.

These together with other objects and advantages which will become subsequently apparent reside in the details of construction and operation as more fully hereinafter described and claimed, reference being had to the accompanying drawings forming a part hereof, wherein like numerals refer to like parts throughout.

Brief description of the drawing figures

FIGURE 1 is a block diagram illustrating the system of the present invention.

FIGURE 2 is a simplified diagrammatic illustration of the apparatus associated with the present invention.

FIGURE 3 is an electrical circuit diagram showing the controls associated with the system of the present invention.

Description of the preferred embodiment

Referring now to the drawings in detail, it will be observed from FIGURE 1 that fluid is supplied to a spray head 10 from a supply line 12 into which chemical ingredients are introduced from a source of chemicals 14 by means of an assembly of pumps 16. Fluid is supplied to the spray head at a pressure and temperature regulated by the regulators 18 and these conditions are monitored by the line monitors 20. When fluid flow is sensed by the sensor component 22, operation of the pumps is initiated under control of the control components 24. In this manner, felt may be conditioned by the application of liquid in spray form discharged from the spray head 10.

Referring now to the apparatus shown in FIGURE 2, it will be observed that the spray head 10 is provided with a plurality of discharge orifice portions 26 from which overlapping spray jets are discharged onto the felt 28 being conditioned. The supply line 12 is in the form of a conduit connecting the spray head to a source of water under pressure (not shown), the water being admitted into the supply conduit through a water cutoff valve 30. The regulators include, a pressure regulator 32 of any suitable type. Also, the temperature of the water is controlled by the supply of steam to the supply conduit 12 through the steam inlet line 34 within which a steam line regulator 36 is located. The temperature of the liquid which finally enters the spray head 10 is accordingly monitored by the temperature gage 38 while the pressure is monitored by the pressure gage 40. The chemical ingredients are introduced into the supply conduit 12 between the line monitoring gages and the supply line regulators by means of the pumps which include a slug pump 42 and two continuous pumps 44 and 46.

Each of the pumps has associated therewith, a self-priming valve assembly 48 so as to avoid the introduction of air into the supply conduit. Pump priming valve assemblies of this type are well known as disclosed for example in Patent No. 2,956,505. The pump priming valve assemblies are located in the discharge line of the pumps connected to the supply conduit 12 through one-way check valves 50. The slug pump 42 is of a type manufactured for example by Worthington Corporation, of East Orange, N.J., referred to as Rotary Pump Model 1–GAM. The continuous pumps 44 and 46 on the other hand are of a type manufactured for example by Chemical Pump Corporation, of Waltham, Mass., referred to as Precision 801. The suction lines from each of the pumps extends into reservoirs or containers 52, 54 and 56 from which the different chemical ingredients are withdrawn. A bypass regulating valve 58 is connected betwen the slug pump 42 and the container 52 in order to control the quantity of chemicals discharged during each timing cycle. The continuous pumps 44 and 46 on the other hand discharge chemical ingredients at predetermined flow rates into the supply conduit when they are operative.

Operation of the pumps is controlled by means of the control components which include a selectively resettable timer 60, an alternating timer 62 and a pressure switch 64. As will be explained, operation of the slug pump 42 is controlled by the timer 60. Operation of the continuous pumps 44 and 46 is interrupted during the timing cycle of timer 60, the continuous pumps being otherwise alternatively operated under control of the alternating timer 62. Further, operation of the timers and pumps is prevented until such time as the flow of water is sensed by the pressure switch 64 connected to the supply conduit by the pressure sensing line 66 for this purpose.

Referring now to the electrical circuit diagram of FIGURE 3, it will be observed that the control components are connected to a source of voltage through the power lines 68 and 70 in order to operate the timer motors 72 and 74 respectively associated with the timers 60 and 62 and the pump motors 76, 78 and 80 respectively associated with the slug pump 42, the continuous pump 44 and the continuous pump 46. A timer switch 82 associated with the timer 60 is normally connected to the power line 68 in series with the pressure switch 64 so as to supply current to one of the timer switches 84 and 86 associated with the alternating timer 62. Current is also supplied through the timer switch 82 to the timer motor 74 associated with the alternating timer in order to complete an energizing circuit therethrough. The timer switches 84 and 86 are accordingly cyclically displaced between the operative positions thereof so as to alternatively supply energizing current to the pump motors 78 and 80 respectively connected to the contacts associated with the timer switches 84 and 86. Glow lamps 88 and 90 are connected across the pump motors 78 and 80 so as to indicate which of the continuous pumps 44 and 46 is operative at any particular time. It will be appreciated therefore, that the continuous pumps 44 and 46 are alternatively operated whenever the pressure switch 64 is closed in order to alternatively supply chemical ingredients from the chemical reservoirs 54 and 56. However, whenever the timer 60 is activated, by closing of the activating switch 92, completing a circuit through the timer motor 72, the timer switch 82 is displaced to its other operative position disconnecting the power line from the alternating timer 62 and connecting the power line instead to the pump motor 76 completing an energizing circuit therethrough.

Thus, during the timing cycle of the timer 60 which may be manually preset, the timer 62 and the continuous pumps under its control will be inoperative. During this interval however, the slug pump 42 will be operative to supply a predetermined quantity of chemicals to the water washing the felt. Upon completion of the timing cycle of the timer 60, the timer switch 82 is restored to its original position reactivating the timer 62 and the continuous pumps 44 and 46 which remain in operation to treat the felt until such time as the timer 60 and slug pump 42 are reactivated. Operation is of course interrupted whenever the circuit is opened by the pressure switch 64 should the flow of water be cut off for any reason.

What is claimed as new is as follows:

1. Apparatus for supplying liquid to a spray head to treat material comprising, a supply conduit connecting said spray head to a source of liquid under pressure, a plurality of reservoirs containing ingredients to be added to the liquid, a plurality of pumps operatively connecting said reservoirs to the supply conduit for respectively introducing at least two of said ingredients into the liquid, cyclic timing means operatively connected to at least two of said pumps for alternatively rendering one of said two pumps operative at predetermined flow rates to introduce said two of the ingredients to the liquid, selectively controlled timing means operatively connected to said cyclic timing means and a third of said pumps for introducing a predetermined quantity of another of the ingredients to the liquid during a timing cycle while said two pumps are inoperative, and pressure responsive control means connected to said timing means for preventing operation of any of said pumps until the liquid is flowing through the supply conduit.

2. The combination of claim 1 wherein said two pumps are of the continuous type and said third pump is of the slug type.

3. The combination of claim 2 wherein each of said pumps is of the self-priming type connected by check valves to the supply conduit.

4. The combination of claim 1 wherein each of said pumps is of the self-priming type connected by check valves to the supply conduit.

5. In a system for treating paper felt by successive application of liquid in spray form, a spray head discharging the liquid onto the felt, a supply conduit connected to the spray head conducting said liquid thereto, said means connected to the supply conduit for introducing different ingredients thereto under pressure and timing mechanism connected to the said means for controlling the intervals during which the different ingredients are successively introduced into the supply conduit by said means.

6. The combination of claim 5 including pressure responsive control means connected to the timing mechanism for preventing operation of the same until a carrier liquid under pressure is conducted through the supply conduit into which said ingredients are introduced.

7. The combination of claim 6 wherein said means includes a slug pump and at least two continuous pumps.

8. The combination of claim 7 wherein said timing mechanism includes an alternating timer connected to said continuous pumps for alternatively rendering one of the continuous pumps operative and a resettable timer connected to the slug pump for rendering the same operative during a preset timing cycle while the continuous pumps are maintained inoperative.

9. The combination of claim 5 wherein said means includes a slug pump and at least two continuous pumps.

10. The combination of claim 9 wherein said timing mechanism includes an alternating timer connected to said continuous pumps for alternatively rendering one of the continuous pumps operative and a re-settable timer connected to the slug pump for rendering the same operative during a preset timing cycle while the continuous pumps are maintained inoperative.

References Cited

UNITED STATES PATENTS

| | | | |
|---|---|---|---|
| 1,599,385 | 9/1926 | Pryor | 92—39 |
| 2,073,654 | 3/1937 | Smiley | 162—190 |
| 3,000,065 | 9/1961 | Dietert et al. | 22—89 |
| 3,032,100 | 5/1962 | Schibbye | 162—308 |
| 3,129,928 | 4/1964 | Huntington | 259—154 |

S. LEON BASHORE, Primary Examiner

J. H. HARMAN, Assistant Examiner